C. G. BRANIGAN.
AUXILIARY FUEL TANK.
APPLICATION FILED OCT. 28, 1920.
1,382,407.  Patented June 21, 1921.
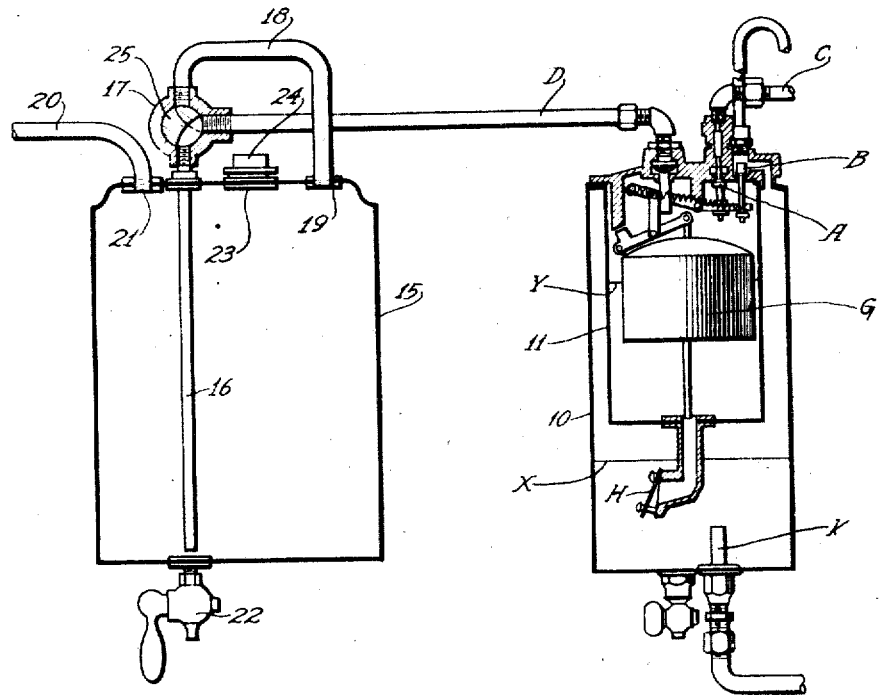
INVENTOR
Clifford G. Branigan
BY
his ATTORNEY

UNITED STATES PATENT OFFICE.

CLIFFORD G. BRANIGAN, OF NEW YORK, N. Y.

AUXILIARY FUEL-TANK.

1,382,407.

Specification of Letters Patent.   Patented June 21, 1921.

Application filed October 28, 1920. Serial No. 420,097.

*To all whom it may concern:*

Be it known that I, CLIFFORD G. BRANIGAN, a citizen of the United States, residing at New York city, in the county of Richmond and State of New York, have invented certain new and useful Improvements in Auxiliary Fuel-Tanks, fully described and represented in the following specification and the accompanying drawings, forming a part of the same.

This invention relates to auxiliary fuel tanks, and is particularly directed to such tanks for use upon motor vehicles.

The invention aims especially to provide an improved auxiliary fuel tank which may be easily applied to the fuel system of existing automobiles, and which will provide a reserve supply of fuel which may be called upon when the main supply carried by the vehicle is exhausted.

In accordance with the invention, the auxiliary fuel tank is so arranged that it is automatically filled from the main fuel tank by suction preferably produced by a connection with the intake manifold of the vehicle engine.

The auxiliary tank possesses peculiar advantages when applied to automobiles having what is known as the vacuum feed system, and when so applied is of extreme simplicity and involves the use of no moving parts.

In order that my invention may clearly be understood, I will describe in detail the specific embodiment of it illustrated in the accompanying drawing which is a diagrammatic sectional elevation of the auxiliary fuel tank as applied to an automobile provided with the vacuum feed system.

At the right-hand side of the drawing is shown the double tank and mechanism customarily used in the vacuum feed system known as the Stewart-Warner system. I shall not describe this mechanism in detail as it is well known to those skilled in the art. Suffice it to say that the tank 11 is connected by a pipe C to the intake manifold of the engine which produces a partial vacuum in the tank 11 which draws gasolene into the tank 11 through the pipe D which is customarily connected to the tank containing the main supply fuel. The suction continues until the gasolene level in the tank 11 rises to Y, when the mechanism connected to the float G closes the valve A controlling the pipe C and opens the valve B connecting the tank 11 to the atmosphere. When this occurs, gasolene flows from the tank 11 through the flap valve H into the tank 10. This continues until the float G falls to such an extent that the valve B is closed and the valve A opened. Then the suction is again applied to the tank 11 drawing in gasolene until this tank is again filled to the level Y. The operation is then repeated, and the valves A and B open and close alternately so that gasolene is supplied to the tank 10 as needed, from which tank it flows through the pipe K to the carbureter of the engine.

In accordance with my invention an auxiliary tank 15 is inserted in the pipe connecting the main fuel supply tank with the Stewart-Warner tank. The tank 15 is closed. The pipe 16 extends into the tank 15 from the top down to a point near the bottom and is connected at its upper end with one port of a three-port valve casing 17. Another port of this valve casing is connected to the pipe D extending from the Stewart-Warner tank. The third port is connected by a pipe 18 to an aperture 19 in the top of the tank 15. A pipe 20 connects the main fuel tank to an opening 21 in the tank 15. The tank 15 may be provided also with a pet cock 22 most desirably located opposite the lower end of the pipe 16 for the withdrawal of sediment, and with a filling opening 23 provided with a closing plug 24. Within the valve casing 17 is a rotary valve 25 provided with a manually operated handle not shown in the drawings.

In order to explain the operation of the auxiliary tank. I will first assume that the main fuel tank and the auxiliary tank 15 are full of gasolene and that the Stewart-Warner tank 10 is filled to the level indicated at X in the drawing, and that the valve 25 occupies the position indicated in dotted lines in the drawing. The automobile engine being then in operation, when vacuum is produced in the tank 11 by the opening of the valve A gasolene is drawn into the tank 11 through the pipes 18 and D from the auxiliary tank 15. As the tank 15 is closed, gasolene from the main fuel tank will be drawn by the suction through the pipe 20 into the auxiliary tank 15, keeping the tank 15 filled with gasolene as long as there is any gasolene in the main fuel tank.

Should the gasolene in the main fuel tank become exhausted, no more gasolene can be drawn into the tank 15 through the pipe 20, and as soon as the gasolene level in the tank 15 is slightly lowered by the withdrawal of the gasolene through the pipe 18 no more gasolene can pass from the tank 15 through the pipes 18 and D to the tank 11, so that the auxiliary tank 15 will remain substantially full of gasolene. As soon, therefore, as the gasolene contained in the tank 10 is exhausted to the level of the pipe K the engine will stop, warning the operator that the fuel in the main tank is exhausted.

In order for the operator then to obtain the benefit of the fuel stored in the tank 15 to proceed to the nearest source of fuel supply, it is merely necessary to turn the valve 25 to the position indicated in full lines in the drawing. This will connect the pipe D with the pipe 16 instead of the pipe 18. The suction produced in the pipe C by cranking the engine will draw gasolene through the pipes 16 and D from the auxiliary tank 15 into the tank 11 from which it will run into the tank 10 so that the motor may be operated. The suction produced by the operation of the motor will then continue to draw gasolene from the auxiliary tank 15 through the pipe 16 until the supply in the tank 15 is exhausted. Under ordinary circumstances the operator will be enabled to reach a point of supply with his car before the gasolene in the tank 15 is exhausted.

When the engine is again started, after the main fuel tank has been refilled, and the valve 25 having been returned to the position indicated in dotted lines in the drawing, the suction produced by the engine in the pipe C and the tank 11 will draw air from the tank 15 through the pipes 18 and D producing a partial vacuum in the tank 15 which will draw gasolene into the tank 15 from the main supply tank through the pipe 20. No gasolene can be withdrawn from the tank 15 through the pipe 18 until the tank 15 is completely filled. During the filling of the tank 15 only air will be drawn into the tank 11 through the pipe D so that the gasolene level in the tank 11 will not rise to Y and the float G will hold the valve A open so that the suction from the engine will be continuously applied to the tank 11 and consequently to the tank 15. As soon, however, as the tank 15 has been filled, gasolene will be drawn from it through the pipes 18 and D into the tank 11 until the float G rises so as to close the valve A, thereby cutting off the suction from the engine and permitting the gasolene to flow from the tank 11 into the tank 10 and thus to the engine, after which the suction will operate intermittently in accordance with the ordinary operation of the Stewart-Warner system described above.

The tank 15 is made of such capacity that the gasolene ordinarily retained in the tank 10 of the Stewart-Warner system is sufficient to run the engine while the tank 15 is filling, so that no interruption of the engine operation is caused in filling the auxiliary tank. If, however, the engine has been operated after the exhaustion of the supply in the main fuel tank until all the gasolene in the tank 15 is exhausted and the gasolene in the tank 10 has been lowered to the level of the top of the pipe K, a slightly different method is adopted. In this case, after the filling of the main gasolene tank the valve 25 is retained in the position indicated in full lines. The engine is then cranked and the suction thus produced in the tank 11 produces a partial vacuum in the tank 15, drawing gasolene from the main supply tank into the tank 15 through the pipe 20. As soon as this gasolene reaches the level of the lower end of the pipe 16, which is substantially at the bottom of the tank 15, gasolene is drawn through the pipe 16 into the tank 11, refilling the tank 10 with substantially no more cranking than is necessary to refill this tank when, with the Stewart-Warner tanks connected in the ordinary way, the gasolene in the tank 10 has been exhausted to the level of the pipe K. As soon as the tank 10 of the Stewart-Warner system is refilled by the cranking, the engine may be operated, and the valve 25 having been turned to the position shown in dotted lines in the drawing, the tank 15 will be filled by the operation of the engine as before described.

From the above description it is apparent that my auxiliary tank may be introduced in the ordinary vacuum feed system without alterations and that it is of extremely simple and compact construction and contains no moving parts. During the operation of the vehicle the tank is kept constantly filled so that it is always ready for use in an emergency by merely turning the valve 25. Furthermore, the refilling of the tank involves no interruption of the engine operation.

Many modifications may be made in the particular embodiment described without departing from my invention, which consists essentially in providing an auxiliary fuel tank connected in the pipe from the main fuel tank to the carbureter and adapted to be filled by suction preferably produced by the engine.

What is claimed is:

1. The combination with an automobile having a main fuel supply tank, a vacuum feed tank containing a float, and an engine, of a closed auxiliary fuel tank, a connection between the main tank and the auxiliary tank, and a connection between said vacuum tank and said auxiliary tank, including manually operated means by which the suction of said vacuum tank may be applied at will either at the top of said auxiliary tank or at a point near its bottom.

2. The combination with an automobile having a main fuel supply tank, a vacuum feed tank containing a float, and an engine, of a closed auxiliary fuel tank, a connection between the main tank and the auxiliary tank, an intake pipe extending to the vacuum feed tank, a pipe connected to an aperture in the top of the auxiliary tank, a pipe opening into the auxiliary tank near its bottom, and a valve adapted to connect said intake pipe with either of said last-mentioned pipes.

3. The combination with an automobile having a main fuel supply tank, a vacuum feed tank containing a float, and an engine, of a closed auxiliary fuel tank, a connection between the main tank and the auxiliary tank, a three-port valve casing, a pipe connected to one port of said casing extending into the auxiliary tank and communicating with said tank near its bottom, a pipe connecting another port of said valve casing to an aperture in the top of said auxiliary tank, an intake pipe connecting the third port of said valve casing with said vacuum feed tank, and a valve in said valve casing adapted to connect the port with which said intake pipe is connected with either of the other ports.

4. The combination with an automobile having a main fuel supply tank, a vacuum feed tank containing a float, and an engine, of a closed auxiliary fuel tank, a connection between the main tank and the auxiliary tank, a three-port valve casing, a pipe connected to one port of said casing extending into the auxiliary tank and communicating with said tank near its bottom, a pipe connecting another port of said valve casing to an aperture in the top of said auxiliary tank, an intake pipe connecting the third port of said valve casing with said vacuum feed tank, and a valve in said valve casing adapted to connect the port with which said intake pipe is connected with either of the other ports, said auxiliary tank having a normally closed clearing aperture in its bottom below the end of the pipe extending into the tank.

In testimony whereof I have hereunto set my hand in the presence of two subscribing witnesses.

CLIFFORD G. BRANIGAN.

Witnesses:
MAISIE MAURUS,
LILLIAN R. FOX.